United States Patent
Sannino et al.

(10) Patent No.: US 8,334,615 B2
(45) Date of Patent: Dec. 18, 2012

(54) SYSTEM, APPARATUS AND METHOD FOR POWER TRANSFER TO VESSELS

(75) Inventors: Ambra Sannino, Västerås (SE); Georgios Demetriades, Västerås (SE); Lars Hultqvist, Västerås (SE); Ola Norén, Oslo (NO)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/158,164

(22) Filed: Jun. 10, 2011

(65) Prior Publication Data

US 2011/0304207 A1   Dec. 15, 2011

Related U.S. Application Data

(63) Continuation of application No. PCT/EP2009/066993, filed on Dec. 11, 2009.

(60) Provisional application No. 61/121,970, filed on Dec. 12, 2008.

(51) Int. Cl.
*H02J 3/14* (2006.01)
(52) U.S. Cl. .......................................... 307/38; 307/11
(58) Field of Classification Search .................. None
See application file for complete search history.

(56) References Cited

U.S. PATENT DOCUMENTS

| | | | | |
|---|---|---|---|---|
| 3,808,451 A | * | 4/1974 | Pittet .............................. | 307/64 |
| 5,804,953 A | * | 9/1998 | Bowyer et al. ................ | 323/256 |
| 2003/0000801 A1 | | 1/2003 | Spannhake et al. | |
| 2003/0034693 A1 | * | 2/2003 | Wareham et al. .............. | 307/23 |
| 2004/0130292 A1 | * | 7/2004 | Buchanan et al. ............. | 320/116 |
| 2005/0184589 A1 | * | 8/2005 | Fujita ............................... | 307/19 |
| 2006/0076835 A1 | | 4/2006 | Slocum | |
| 2008/0252469 A1 | * | 10/2008 | Perten et al. ................... | 340/585 |

FOREIGN PATENT DOCUMENTS

| | | |
|---|---|---|
| DE | 102005056700 A1 | 6/2007 |
| WO | 2006079363 A1 | 8/2006 |

OTHER PUBLICATIONS

WO 2008102543 to Sugano et al., english translation.*
International Preliminary Report on Patentability; PCT/EP2009/066993; Apr. 6, 2011; 7 pages.
International Search Report and Written Opinion of the International Searching Authority; PCT/EP2009/066993; Jun. 7, 2010; 11 pages.

* cited by examiner

*Primary Examiner* — Rexford Barnie
*Assistant Examiner* — Justen Fauth
(74) *Attorney, Agent, or Firm* — St. Onge Steward Johnston & Reens LLC

(57) ABSTRACT

A system for supplying electric power from a main power grid to a plurality of ships moored at a respective berth of a quay. The system includes a connection point for connecting to the grid supplying electrical power at a first frequency, a frequency converter arrangement for converting electric power from the grid at the first frequency to electric power at a second frequency, a first connector, arranged to provide power from the grid at the first frequency, a second connector, arranged to provide power at the second frequency from the frequency converter arrangement, a plurality of switches, each switch being configured to supply of power from either of the two connector to a respective berth, the system further includes a plurality of ship connection arrangements connected to a respective switch, each ship connection arrangement being adapted for connection to an electric system of a ship. A corresponding arrangement and method are also presented.

8 Claims, 2 Drawing Sheets

SYSTEM, APPARATUS AND METHOD FOR POWER TRANSFER TO VESSELS

CROSS-REFERENCE TO RELATED APPLICATIONS

The present application is a continuation of pending International patent application PCT/EP2009/066993 filed on Dec. 11, 2009 which designates the United States and claims the benefit under 35 U.S.C. §119(e) of the U.S. Provisional Patent Application Ser. No. 61/121,970, filed on Dec. 12, 2008, the content of which is incorporated herein by reference.

FIELD OF THE INVENTION

The invention relates to electric power supply of ships, especially moored ships in a port.

BACKGROUND OF THE INVENTION

Modern ships can be designed like floating power plants. Such ships can use the electricity generated onboard to provide power for a wide range of applications. Lighting, heating, cooling, ventilation, pumps, navigation systems and cargo related activities are examples of such applications.

Many large cruise ships commonly use diesel electric propulsion systems. One reason for this is the easiness of manoeuvring, especially during docking. An example is to have the propulsion provided by means of several diesel engines coupled to main generators, which drive the electric motor that runs the propeller on the ship. The same generators that are used for propulsion can also be used to generate auxiliary power onboard the vessel for lights, refrigeration, etc.

At sea, power generation onboard can be provided by a main generator that is coupled with one or more electric propulsion engines, in combination with auxiliary generators for generating sufficient power. At berth, the main engines can be shutdown and the auxiliary generators take control of all power generation onboard. To be able to also shut down the auxiliary generators, an external power supply is required while mooring at a quay.

For a modern cruise ship, the power needed while at sea can be up to 18 MW. To be able to handle such an extent of power, high voltage, e.g. 6-11 kV, is used onboard. When the vessel docks at the berth there is no need to produce the same quantity of power to drive the propulsion motors, so therefore a majority of the main generators are shut down and only a few generators are used to manage the power needed, e.g. for powering hotel equipment.

Shore side power supply has been used for supplying ferries with electricity. Since many ferries are always docked in the same position at the same quay it easy to provide a suitable connection. Today, some other types of commercial ships, such as, cruise, container, and Ro/Ro (roll-on/roll-off) vessels are connected to the electrical grid in ports around the world.

Typical power requirements for Ro/Ro- and Container vessels are high voltage, like 6.6 kV and 7.5 MVA power. Cruise vessels can also require high voltage, e.g. 6.6 kV or 11 kV, depending on the power demand of the vessel.

In 2000 a high voltage ship connection for vessel power supply was made in the port of Gothenburg.

A problem with power supplies to ships is that different countries use AC power transmissions at different frequencies, e.g. 60 Hz in U.S.A. and 50 Hz in European countries. Each ship usually uses either 50 or 60 Hz systems for their equipment. Hence, when power is supplied from a port, this causes a problem where the frequency of the port and the ship differs. Frequency converters can then be used to convert the frequency from the grid frequency of the port to the frequency of the ship.

However, frequency conversion needs to be done with great efficiency to reduce cost and increase reliability.

SUMMARY OF THE INVENTION

Since no standard voltage level exists for ships a connection box at each berth of a quay would be suitable if it could supply power at different voltage levels, individually selectable for the arriving vessel in question.

According to a first aspect of the invention, it is presented a system for the adaptation of electric power from a main grid to a plurality of ships, comprising: a grid connection arrangement having an input for connection to the main grid, a frequency converter, a first output connected to the input, and a second output, wherein the second output is connected to the input via the frequency converter, such that when the system is connected to a main grid, power at a first frequency is provided at the first output, and power at a second frequency is provided at the second output, respectively, a plurality of ship connection arrangements for power transfer to a respective ship, each of the ship connection arrangements being connected to a feeding line extending from the grid connection arrangement to a respective one of the ship connection arrangements, wherein each ship connection arrangement is arranged at a respective quay-berth, and a switching arrangement for selectively connecting each feeding line to the first output or to the second output.

The first output and second output may include a first and a second busbar, respectively.

The system may include a controller for controlling the switching arrangements.

The controller may comprise means for receiving power requirements for a ship arriving at one of the quay-berths.

The power requirements may include operation frequency and the controller may be adapted to control the switching arrangement such that power at the operation frequency is supplied to the ship connection arrangement at the respective quay berth.

The power requirements may include voltage level and the controller is adapted to control the ship connection arrangement to supply power at the voltage level of the power requirements to the ship.

Each ship connection arrangement may comprise a transformer.

At least one of the transformers may be provided with two outputs at two different voltage levels and each ship connection arrangement may further comprise a second switching arrangement for selectively connecting each ship to the a first output or to a second output of the respective transformer.

Also, embodiments provide means to choose a suitable voltage level for the ship in question. Both the frequency and the voltage level can be selected independently for each quay berth, so that the respective ship can be supplied with the appropriate electrical power.

In accordance with the invention a centrally placed installation for frequency conversion with matching switchgears can be connected to double frequency outputs. A frequency converter, or several parallel connected frequency converters—depending on the power demand in the specific port, is coupled to one of the outputs via a step-down and a step-up transformer. To enable connection of simultaneously 50 Hz as well as 60 Hz vessels at the different berths, an additional output is integrated, which is directly connected to the national grid via a transformer. In that case, there is an output providing 50 Hz and the second output providing 60 Hz. Each berth that is connected from the centrally placed facility is fed via a breaker and a change-over switch. The change-over switch makes it possible to choose which output shall be connected to the berth at that specific occasion.

An advantage with this configuration is that the frequency converter is only used for what it is needed for, converting e.g. 50 Hz to 60 Hz. For example, in a port where the grid frequency is 50 Hz, this arrangement is not burdened by the 50 Hz vessels where the converters can be bypassed, resulting in a higher efficiency in this facility. The capacity of the total installed frequency converter power can be exploited at a centrally placed frequency converter, rather then a separate frequency converters at each berth, where it is impossible to take advantage of the overcapacity of the frequency converter when a vessel with less amount of power demand is connected. Furthermore, using a centrally placed frequency converter allows greater flexibility in adapting the capacity of frequency conversion to correspond to demand. A suitable power output to each berth will be between 5-10 MVA, for example 7.5 MVA for container and Ro/Ro vessels. With a centrally placed frequency converter, it possible to dimension the frequency converter to the collective actual power demand at the terminal. The transformer and other connection equipments at each berth can be dimensioned according to a stated power, such as 7.5 MVA. The equipment itself at each berth should not cause a bottleneck, so it is possible to connect additionally frequency converters in parallel as the power demand increases with new and bigger vessels.

An advantage is that the inventive system layout requires a relatively small space at each berth. The majority of the equipment is centrally placed, and can be placed far away from the terminals, where there is more space available. Frequency converters are not needed at each berth.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
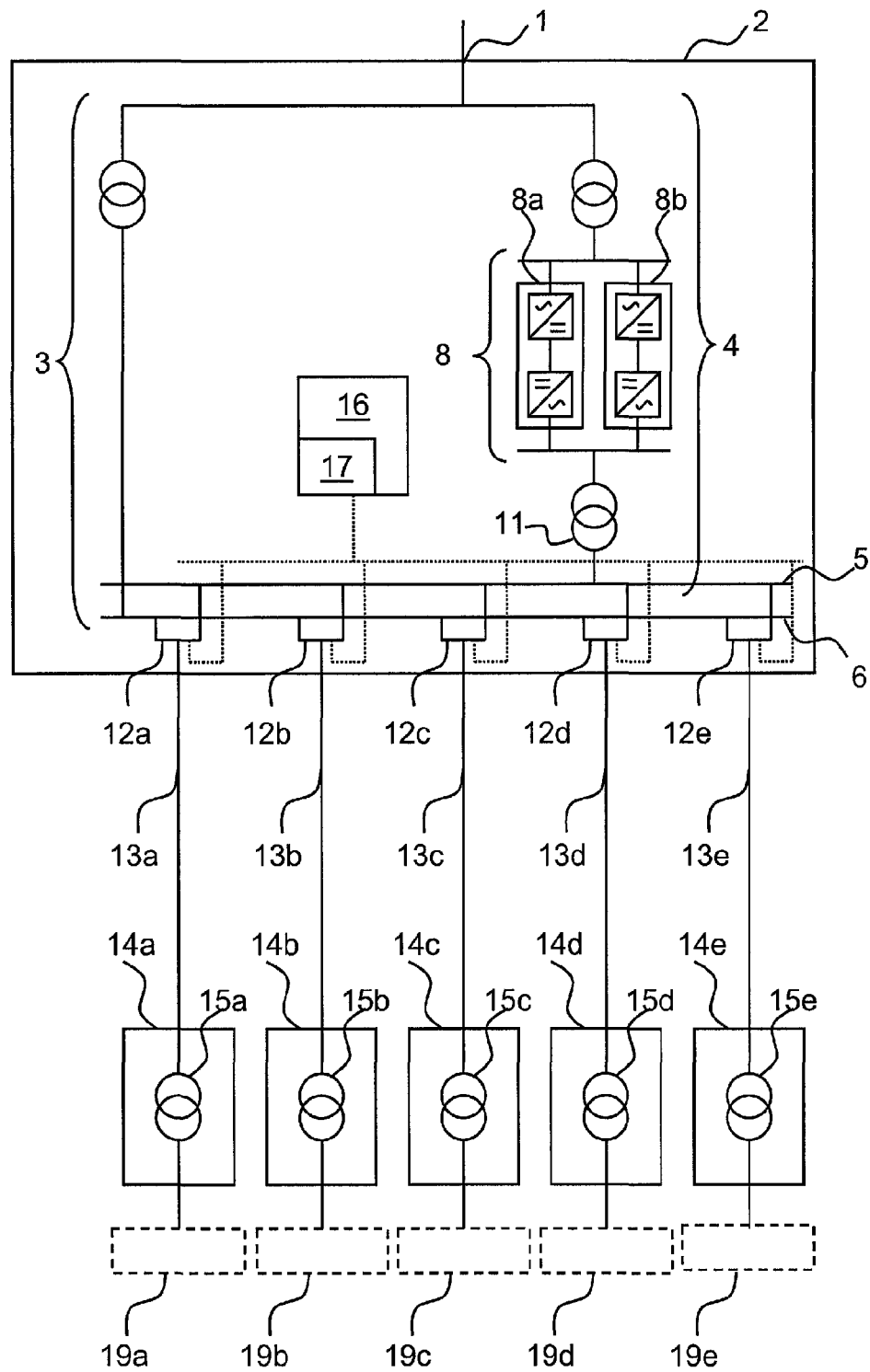
FIG. 1 is a schematic diagram illustrating a system according to an embodiment of the present invention.

The embodiments comprise a grid connection 1 that is suitable for supplying power from a national main electrical power transmission grid, providing a power output to vessels at two frequencies, e.g. 50 Hz and 60 Hz. Ship connection arrangements 14a-e are provided for ships at suitable berths 19a-e at the quay, where each ship connection arrangement is capable of providing a power supply from either of the power outputs, i.e. a ship having a 50 Hz powering system is connected to the 50 Hz output, while a ship using an electrical system of 60 Hz will be connected to the 60 Hz output. FIG. 1 illustrates an embodiment wherein electrical power from a main power transmission grid having a first AC frequency is converted into a second frequency and power at the first and second frequency is output to a respective first and second output, which outputs can be busbars. A switch is provided to connect a selected one of the outputs, i.e. supply power at a selected frequency, to one of the ship connection arrangements 14a-e. Each of the ship connection arrangements 14a-e can independently be connected to any one of the outputs. Consequently, each ship can select a power supply at a compatible frequency.

The grid connection arrangement comprises a connection point 1 being an input that is electrically connected to a main AC power grid. The electrical power is supplied from the grid at a first frequency and a main grid voltage level, usually high voltage. The input is provided in an illustrated arrangement 2 having two parallel power branches 3, 4, for transferring and adapting the electrical power to its two outputs 5, 6. The two outputs 5, 6 can be two busbars. The first branch 3 provides power at the first frequency, i.e. the frequency of the main grid, for example 50 Hz. The first branch 3 is suitably provided with a transformer 7, for providing a suitable output voltage level, e.g. at a medium or high voltage. The second branch 4 includes a frequency converting arrangement 8, for example two parallel frequency converters 8a-b, providing an output at a second frequency, different from the first frequency, for example 60 Hz. Additional or fewer frequency converters can be added as necessary, in parallel with the frequency converters 8a-b to provide increased (or reduced) capacity and/or redundancy. In one embodiment, each converter 8a-b comprises a rectifier and an inverter connected in a back-to-back fashion. In one embodiment, the DC bridges are connected on a DC bus. This allows for a more flexible structure of individual inverters and rectifiers.

In one embodiment, the rectifiers are controlled with respect to a desired reactive power, to compensate for transformers in the system or to achieve a desired reactive power in relation to the power grid.

The second branch 4 is optionally provided with a first transformer 10, at the input of the second branch 4, providing a voltage level suitable for the frequency converter arrangement 8. The second branch is also optionally provided with a second transformer 11 at the output of the second branch for providing a suitable output voltage level.

In one embodiment, the first and second branches 3,4 can selectably be connected to either of the outputs 5, 6. In this way, when for example one frequency is not required at any of the berths 19a-e, the output associated with that frequency is available for maintenance. In one embodiment, three outputs are provided where either frequency can be provided to each of the three outputs, providing even greater flexibility e.g. for maintenance.

The voltage levels being drawn from the grid connection arrangement need to be transformed into a voltage which is suitable for transfer to ship connections at the quay berths, also in view of providing suitable input levels for transformers at the quay berths. Ultimately, the voltage levels are chosen to suit the electrical power systems on the ships.

Thus, the grid connection arrangements provides two outputs, a first power output at a first frequency and a second power output at a second frequency. The grid connection arrangement provides these outputs at respective outputs 5, 6.

Switches 12a-e are provided for selectively connecting each of the ship connection arrangements 14a-e to the outputs. In one embodiment, for every berth 19a-e at the quay, there are two switches, one for each output, for selecting which output to draw power from. Hence, these switches can connect a selected one of the outputs to a feeding line 13a-e that extends from the grid connection arrangement 2 to a respective berth 19a-e. Only one output at a time is connected to each transmission line, in order to avoid a short circuit between the outputs. Thus every quay berth 19a-e can be selectively connected to any one of the outputs 5, 6. These two switches for every berth 19a-e provide connections to the berths that are mutually independent.

The outputs 5,6 are suitably installed in a position close to the berths, actual port configuration permitting, in order to reduce the length of the transmission lines 13a-e.

Each quay berth 19a-e, is optionally provided with a transformer station, including a transformer 15a-e, and grounding. The transformer provides optional voltage conversion and galvanic isolation between each ship and the system, the grid and other ships.

To provide different voltage levels, the transformer can optionally be a transformer that provides two outputs at two different voltage levels. Alternatively, a delta- and a Y-connection can be used for providing the voltage level shift when switching from delta to Y. In one embodiment, the voltage supplied to the vessel is selectable between 10.5 kV and 6.6 kV.

The proposed system optionally uses a transformer located in the substation (at the point of connection to the utility grid) to adapt the voltage level to a suitable level for distribution in the port. This could also be the same voltage level at which the vessel are to be connected. The transformer is connected to a system of bus-bars in the substation, i.e. a grid frequency busbar.

A back-to-back converter is located in the substation (at the point of connection to the utility grid), for frequency conversion, e.g. from 50 Hz to 60 Hz, or from 60 Hz to 50 Hz. The converter is connected to a second system of bus-bars in the substation.

Outgoing feeding lines 13a-e to the quays in the port (one cable per connection point) are provided. For each outgoing feeding line 13a-e, a switching arrangement, e.g. a set of two switches with interlocking to connect each feeder to either the 50 Hz- or the 60 Hz-busbar system is provided. A connection box at each ship connection point is illustrated, which may include a switch.

The system also includes a control system 16, or controller, that collects information on the status of the switches. The control system 16 also collects information on the frequency and amplitude of supply voltage that are required by the ship at each quay berth. The control system 16 is adapted to automatically perform the necessary switching actions to enable connection and disconnection of the vessel, to provide the appropriate voltage level at the appropriate frequency. The control system comprises means 17 for receiving power requirements for a ship arriving at one of the quay-berths. This means can for example be an input output interface or a radio receiver, etc.

Here now follows an example of how the system can be used. An incoming vessel contacts the port, and is assigned a berth at the quay. The berth is provided with a connector for power supply; which connector initially is disconnected from the power supply. The corresponding connecting members of the ship are connected to the connecting members of the berth, after the ship has moored. The frequency of the power is selected, e.g. 50 or 60 Hz to correspond to the frequency used on the incoming vessel. The switches are connected between the output with the chosen frequency and the feeding line to the berth. If the function is available, a voltage is selected which is compatible with the incoming vessel. Monitoring and control functions can suitably be integrated in the control system, so that the correct voltage and frequency is used for each ship, with central control from the substation, or other central location. Thus, the control system can be adapted to provide the possibility to select, in a flexible way for each vessel, the frequency and voltage desired for the supply without additional equipment at the quay than a connection box.

The feeding lines are suitably dimensioned for the maximum current and voltage in the range of frequencies and voltage that may be used in the system. At least one, or some but not all, are dimensioned for the maximum requirements. In one embodiment, the larger berths in a system are more likely to require higher power output, due to larger vessels being able to moor at these berths, whereby only the equipment corresponding to the larger berths are dimensioned for the maximum vessel power.

In an embodiment of the invention, fault current limiters are used to cope with increased short circuit power when operating connected to the utility grid. Fault current limiters could also be placed at the substation. An alternative is to properly select the impedance of the transformer.

The control system is suitably coordinated with the control system on the vessel, for controlling the synchronization and connection of the generators on the vessel's distribution system. Furthermore the phase of the incoming power can be matched to the vessel's electrical system.

It is to be noted that the system described above is equally applicable to supply frequency of 50 Hz and 60 Hz when the grid frequency is 50 Hz as well as when the grid frequency is 60 Hz.

Figure 2:
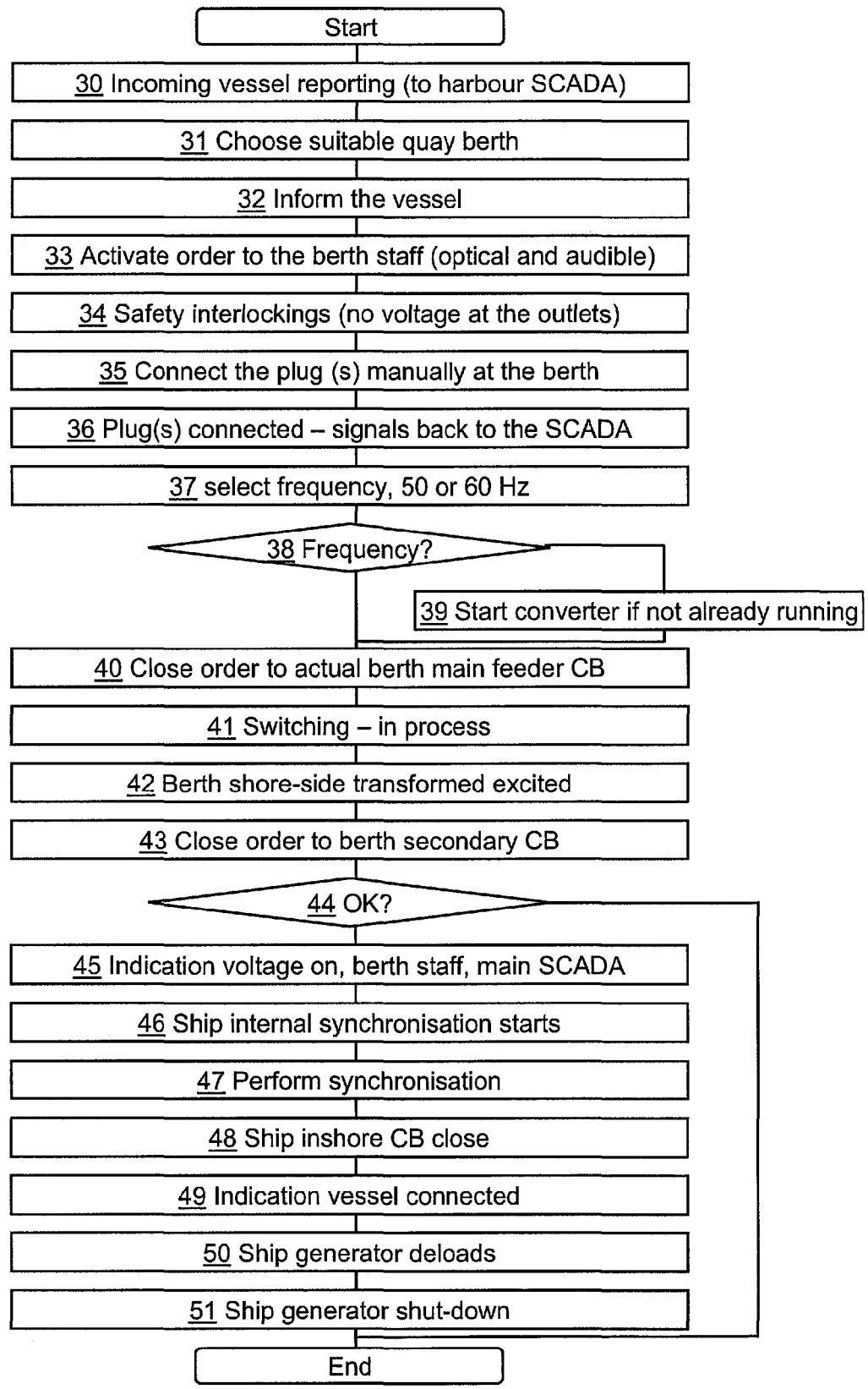
FIG. 2 is a flow chart illustrating a method using an embodiment of the present invention.

FIG. 2 is a flow chart illustrating a method using an embodiment of the present invention. Here, a detailed scenario is shown in steps 30-51. In particular, it can be noted how synchronisation occurs in step 47 by adjustments in the ship generator(s) settings with regard to voltage and speed.

It is to be noted that while the embodiments disclosed above mention five berths for docking, the invention is applicable to any suitable number of berths.

Here now follows a set of numbered clauses, corresponding to embodiments of the present invention.

i. A system for supplying electric power from a main power grid to a plurality of ships moored at a respective berth, the system comprising
   a connection point for connecting to the grid supplying electrical power at a first frequency,
   a frequency converter arrangement for converting electric power from the grid at the first frequency to electric power at a second frequency,
   a first connector, arranged to provide power from the grid at the first frequency,
   a second connector, arranged to provide power at the second frequency from the frequency converter arrangement,
   a plurality of switches, each switch being configured to supply of power from either of the two connector to a respective berth,
   the system further comprising a plurality of ship connection arrangements connected to a respective switch, each ship connection arrangement being adapted for connection to an electric system of a ship.

ii. The system according to clause i, wherein the first and second connectors comprise a respective busbar.

iii. The system according to clause i, further comprising a plurality of feeding lines connecting each ship connection arrangement to a respective switch.

iv. The system according to any one of clauses i to iii, further comprising a plurality of transformers, wherein each transformer is arranged between a respective one of the switches and corresponding ship connection arrangements.

v. The system according to clause iv, wherein each of the transformers comprises two outputs, at a first voltage level and at a second voltage level, respectively.

vi. The system according to any one of the preceding clauses, wherein the frequency converter arrangement comprises a plurality of frequency converters connected in parallel.

vii. The system according to any one of the preceding clauses, wherein the converter arrangement is controllable to achieve a desired reactive power in relation to said main power grid.

viii. A substation for supplying electric power to a plurality of ships, the substation comprising:
   a connection point for connecting to a main grid supplying electrical power at first frequency,
   a main frequency converter for converting electric power from the grid at the first frequency to electric power at a second frequency,
   a first connector, arranged to provide power from the main grid at the first frequency,
   a second connector, arranged to provide power at the second frequency from the main frequency converter,
   a plurality of switches, each switch configured to supply of power from either of the two connectors for further distribution to a respective berth.

ix. The substation according to clause viii, wherein the first and second connectors comprise a respective busbar.

x. The substation according to clause viii or ix, further comprising a controller arranged to control the plurality of switches.

xi. The substation according to clause x, wherein the controller is arranged to monitor a status of the switches.

xii. The substation according to clause x or xi, wherein the controller is arranged to receive input data comprising power requirements at the respective berths.

xiii. The substation according to clause xii, wherein the controller is arranged to receive input data comprising frequency information.

xiv. The substation according to clause xiii, wherein the controller is arranged to control the switch for a berth associated with the data, in accordance with the frequency information.

xv. The substation according to any one of clauses xii or xiv, wherein controller is arranged to receive input data comprising voltage information.

xvi. The substation according to clause xiv, wherein the controller is arranged to control a voltage for a berth associated with the data, in accordance with the voltage information.

xvii. The substation according to any one of clauses viii to xvi, wherein the frequency converter is controlled with respect to a desired reactive power, to compensate for transformers in the system or to achieve a desired reactive power in relation to the power grid.

xviii. A method for supplying electric power to a plurality of ships moored at a respective berth, the method comprising the steps of:
   feeding electrical power from a main grid, supplying electrical power at a first frequency, to a first connector,
   converting electric power from the grid at the first frequency to electric power at a second frequency, and feeding the converted power to a second connector,
   connecting one of a plurality of switches corresponding to supply power to, to one of the first and second connectors having a frequency matching a frequency of the ship.

xix. A system for the adaptation of electric power from a main grid to a plurality of ships, comprising
   a grid connection arrangement having an input for connection to the main grid and further comprising
   a frequency converter
   a first output connected to the input,
   and a second output
   the second output being connected to the input via the frequency converter, so that when connected to a main grid, power at a first frequency is provided at the first output, and power at a second frequency is provided at the second output, respectively,
   a plurality of ship connection arrangements for power transfer to a respective ship, each comprising a feeding line extending from the grid connection arrangement to a respective one of a plurality of quay-berths,
   and arranged at a respective quay-berth, and
   a switching arrangement for selectively connecting each feeding line to the first or to the second output.

xx. A system according to clause xix, wherein the first and second output includes a first and a second busbar, respectively.

xxi. A system according to any of clauses xix to xx, including a controller for controlling the switching arrangement.

xxii. A system according to clause xxi, wherein the controller comprises means for receiving power requirements for a ship arriving at one of the quay-berths.

xxiii. A system according to clause xxii, wherein the power requirements include running frequency and the controller is adapted to control the switching arrangement so that power at the ship frequency is supplied to the ship connection arrangement at the respective quay berth.

xxiv. A system according to clause xxii, wherein the power requirements include voltage level and the controller is adapted to control the ship connection arrangement to supply power at the required voltage level of the ship.

xxv. A system according to any of clauses xix to xxiv, wherein each ship connection arrangement comprises a transformer.

xxvi. A system according to clause xxv, wherein at least one of the transformers is provided with two outputs at two different voltage levels.

xxvii. System for the adaptation of electric power from a main grid to a plurality of ships, the adaptation system comprises
   a grid connection arrangement comprising
   a power input side connected to the main grid and adapted for electric AC power at a first voltage and a first frequency,
   a power output side comprising a first and a second output bar,
   a frequency converter arranged to convert power at the first frequency into a second frequency,
   the frequency converter being arranged between the input side and the second output bar,
   the grid connection arrangement adapted to output power at the first frequency at the first output bar, and at the second frequency at the second output bar,
   a distribution arrangement comprising
   a plurality of feeding lines, each feeding line extending from the grid connection arrangement to a respective one of the quay-berths, and a switching arrangement for selectively connecting the first and second output bar to each of one the feeding lines, and a plurality of ship connection arrangements for power transfer to a respective ship, each ship connection arrangement being connected to each feeding line, and arranged at each quay-berth.

xxviii. The system according to clause xxvii, wherein the ship connection arrangement comprises a transformer.

xxix. The system according to clause xxviii, wherein each transformer has outputs at two voltage levels The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A system for the adaptation of electric power from a main grid to a plurality of ships, comprising:
   a grid connection arrangement having an input for connection to the main grid, a frequency converter, a first output connected to the input, and a second output, wherein the second output is connected to the input via the frequency converter, such that when the system is connected to the main grid, power at a first frequency is provided at the first output, and power at a second frequency is provided at the second output, respectively,
   a plurality of ship connection arrangements for power transfer to a respective ship, each of the ship connection arrangements being connected to a feeding line extending from the grid connection arrangement to a respective one of the ship connection arrangements, wherein each ship connection arrangement is arranged at a respective quay-berth, and
   a switching arrangement with interlocking for selectively connecting each feeding line to the first output or to the second output.

2. The system according to claim 1, wherein the first output and second output includes a first and a second busbar, respectively.

3. The system according to claim 1, including a controller for controlling the switching arrangements.

4. The system according to claim 3, wherein the controller comprises means for receiving power requirements for a ship arriving at one of the quay-berths.

5. The system according to claim 4, wherein the power requirements include operating frequency and the controller is adapted to control the switching arrangement such that power at the operating frequency is supplied to the ship connection arrangement at the respective quay berth.

6. The system according to claim 4, wherein the power requirements include voltage level and the controller is adapted to control the ship connection arrangement to supply power at the voltage level of the power requirements to the ship.

7. The system according to claim 1, wherein each ship connection arrangement comprises a transformer.

8. The system according to claim 7, wherein at least one of the transformers is provided with two outputs at two different voltage levels and each ship connection arrangement further comprises a second switching arrangement for selectively connecting each ship to the a first output or to a second output of the respective transformer.

* * * * *